(12) United States Patent
Sundaresan et al.

(10) Patent No.: US 6,505,197 B1
(45) Date of Patent: Jan. 7, 2003

(54) SYSTEM AND METHOD FOR AUTOMATICALLY AND ITERATIVELY MINING RELATED TERMS IN A DOCUMENT THROUGH RELATIONS AND PATTERNS OF OCCURRENCES

(75) Inventors: Neelakantan Sundaresan, San Jose, CA (US); Jeonghee Yi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,379

(22) Filed: Nov. 15, 1999

(51) Int. Cl.[7] .............................................. G06F 17/30
(52) U.S. Cl. ........................... 707/6; 1/5; 1/100; 1/102; 1/104; 1/500.1; 1/501.1
(58) Field of Search ............... 707/1–8, 10, 100–104.1, 707/501.1, 512–513, 500.1, 531; 709/203–224; 704/1–4, 8–10; 706/45–50; 382/219–220

(56) References Cited

U.S. PATENT DOCUMENTS

| | | | | |
|---|---|---|---|---|
| 5,745,360 A | * | 4/1998 | Leone et al. ................. | 364/140 |
| 5,809,499 A | * | 9/1998 | Wong et al. ............. | 178/18.01 |
| 5,819,260 A | * | 10/1998 | Lu et al. .......................... | 707/3 |
| 5,832,182 A | * | 11/1998 | Zhang et al. ................ | 382/226 |
| 5,857,179 A | * | 1/1999 | Vaithyanathan et al. ........ | 707/2 |
| 5,987,446 A | * | 11/1999 | Corey et al. .................... | 707/3 |
| 6,044,366 A | * | 3/2000 | Graffe et al. ............... | 707/102 |
| 6,101,515 A | * | 8/2000 | Wical et al. ................. | 382/227 |
| 6,122,647 A | * | 9/2000 | Horowitz et al. ............... | 707/3 |
| 6,278,997 B1 | * | 8/2001 | Agrawal et al. ................ | 707/6 |

FOREIGN PATENT DOCUMENTS

| | | | | |
|---|---|---|---|---|
| EP | 0304191 | * | 8/1988 | ..................... 15/40 |

OTHER PUBLICATIONS

Krishnapuram, R et al., A fuzzy relative of the k–methods algorithm with application to web document clustering, Fuzzy system conference proceedings, Aug. 1999, pp. 22–25.*

Arimura, H et al., Text data mining: discovery of important keywords in the cyberspace, Digital Libries: Research and Practice, 2000 Kyoto conference, Nov. 2000, pp. 220–226.*

Chakrabarti, S. et al., Mining the Web's link structure, Computer, Aug. 1999, pp. 60–67.*

Ullman, J.D. The MIDAS data–mining project at Stratford, database engineering and applications, Aug. 1999 IDEAS international symposium proceedings, pp. 460–464.*

Ahonen, H, et al., Applying data mining techniques for descriptive phrase extraction in digital collections, Research and technology advances in digital library, proceedings, Apr., 1998, pp. 2–11.*

(List continued on next page.)

*Primary Examiner*—Srirama Channavajjala
(74) *Attorney, Agent, or Firm*—Samuel A. Kassatly

(57) ABSTRACT

A computer program product is provided as an automatic mining system to identify a set of related terms on the World Wide Web that define a relationship, using the duality concept. Specifically, the mining system iteratively refines pairs of terms that are related in a specific way, and the patterns of their occurrences in web pages. The automatic mining system runs in an iterative fashion for continuously and incrementally refining the relates and their corresponding patterns. In one embodiment, the automatic mining system identifies relations in terms of the patterns of their occurrences in the web pages. The automatic mining system includes a relation identifier that derives new relations, and a pattern identifier that derives new patterns. The newly derived relations and patterns are stored in a database, which begins initially with small seed sets of relations and patterns that are continuously and iteratively broadened by the automatic mining system.

9 Claims, 3 Drawing Sheets

OTHER PUBLICATIONS

Sergey Brin, Extracting Patterns and relations from the world wide web, The world wide web and databases, International workshop WebDB Mar. 1998, 12 pages.*

R. Larson, "Bibliometrics of the World Wide Web: An Exploratory Analysis of the Intellectual Structure of Cyberspace," Proceedingss of the 1996 American Society for Information Science Annual Meeting, also published as a technical report, School of Information Management and Systems, University of California, Berkeley, 1996, which is published on the World Wide Web at URL: http://sherlock-.sims.berkeley.edu/docs/asis96/asis96.html.

D. Gibson et al., "Inferring Web Communities fom Link Topology," Proceedings of the $9^{th}$ ACM. Conference on Hypertext and Hypermedia, Pittsburgh, PA, 1998.

D. Turnbull. "Bibliometrics and the World Wide Web," Technical Report University of Toronto, 1996.

K. McCain, "Mapping Authors in Intellectual Space: A technical Overview," Journal of the American Society for Information Science, 41(6):433–443, 1990.

S. Brin, "Extracting Patterns and Relations from the World Wide Web," WebDB, Valencia, Spain, 1998.

R. Agrawal et al., "Fast Algorithms for Mining Association Rules," Proc. of the 20th Int'l Conference on VLDB, Santiago, Chile, Sep. 1994.

R. Agrawal et al., Mining Association Rules Between Sets of Items in Large Databases, Proceedings of ACM SIGMOD Conference on Management of Data, pp. 207–216, Washington, D.C., May 1993.

S. Chakrabarti et al. "Focused Crawling: A New Approach to Topic–Specific Web Resource Discovery," Proc. of the $8^{th}$ International World Wide Web Conference, Toronto, Canada, May 1999.

B. Huberman et al., "Strong Regularities in Word Wide Web Surfing," Xerox Palo Alto Research Center.

A. Hutchunson, "Metrics on Terms and Clauses," Department of Computer Science, King's College London.

J. Kleinberg, "Authoritative Sources in a Hyperlinked Environment," Proc. of 9th ACM–SIAM Symposium on Discrete Algorithms, May 1997.

R. Srikant et al., "Mining Generalized Association Rules," Proceedings of the $21^{st}$ VLDB Conference, Zurich, Swizerland, 1995.

W. Li et al., "Facilitating comlex Web queries through visual user interfaces and query relaxation," published on the Word Wide Web at URL: http://www.7scu.edu.au/programme/fullpapers/1936/com1936.htm as of Aug. 16, 1999.

G. Piatetsky–Shapiro, "Discovery, Analysis, and Presentation of Strong Rules," pp. 229–248.

R. Miller et al., "SPHINX: A Framework for Creating Personal, Site–specific Web Crawlers," published on the Word Wide Web at URL: http://www.7scu.edu.au/programme/fullpapers/1875/com1875.htm as of Aug. 16, 1999.

S. Soderland. "Learning to Extract Text–based Information from the World Wide Web," American Association for Artificial Intelligence (www.aaai.org), pp. 251–254.

G. Plotkin. "A Note Inductive Generalization," pp. 153–163.

R. Feldman et al., "Mining Associations in Text in the Presence of Background Knowledge," Proceedings of the Second International Conference on Knowledge Discovery and Data Mining, Aug. 2–4, 1996, Portland, Oregan.

R. Kumar et al., "Trawling the Web for Emerging Cyber-Communities," published on the Word Wide Web at URL: http://www8.org/w8–papers/4a–search–mining/trawling/trawling.html as of Nov. 13, 1999.

"Acronym Finder", published on the Word Wide Web at URL:http://acronymfinder.com/ as of Sep. 4, 1999.

* cited by examiner

SYSTEM AND METHOD FOR AUTOMATICALLY AND ITERATIVELY MINING RELATED TERMS IN A DOCUMENT THROUGH RELATIONS AND PATTERNS OF OCCURRENCES

CROSS-REFERENCE TO RELATED APPLICATIONS

This application relates to co-pending U.S. patent application Ser. No. 09/440,625, is now pending titled "System and Method for the Automatic Mining of Acronym-expansion Pairs Patterns and Formation Rules", Ser. No. 09/440,203, is now pending titled "System and Method for the Automatic Construction of Generalization—Specialization Hierarchy of Terms", Ser. No. 09/440,602, is now pending titled "System and Method for the Automatic Recognition of Relevant Terms by Mining Link Annotations", Ser. No. 09/439,758, is now pending titled "System and Method for the Automatic Discovery of Relevant Terms from the World Wide Web", and Ser. No. 09/440,626, is now pending titled "System and Method for the Automatic Mining of New Relationships", all of which are assigned to, and were filed by the same assignee as this application on even date herewith, and are incorporated herein by reference in their entirety.

BACKGROUND OF THE INVENTION

1. Field of the Invention

The present invention relates to the field of data mining, and particularly to a software system and associated method for identifying a set of related information on the World Wide Web. More specifically, the present invention relates to the automatic and iterative mining and refinement of patterns of occurrences and relations using a duality concept.

2. Description of Related Art

The World Wide Web (WWW) is a vast and open communications network where computer users can access available data, digitally encoded documents, books, pictures, and sounds. With the explosive growth and diversity of WWW authors, published information is oftentimes unstructured and widely scattered. Although search engines play an important role in furnishing desired information to the end users, the organization of the information lacks structure and consistency. Web spiders crawl web pages and index them to serve the search engines. As the web spiders visit web pages, they could look for, and learn pieces of information that would otherwise remain undetected.

Current search engines are designed to identify pages with specific phrases and offer limited search capabilities. For example, search engines cannot search for phrases that relate in a particular way, such as books and authors. Bibliometrics involves the study of the world of authorship and citations. It measures the co-citation strength, which is a measure of the similarity between two technical papers on the basis of their common citations. Statistical techniques are used to compute this measures. In typical bibliometric situations the citations and authorship are explicit and do not need to be mined. One of the limitations of the bibliometrics is that it cannot be used to extract buried information in the text.

Exemplary bibliometric studies are reported in: R. Larson, "Bibliometrics of the World Wide Web: An Exploratory Analysis of the Intellectual Structure of Cyberspace," Technical report, School of Information Management and Systems, University of California, Berkeley, 1996. http://sherlock.sims.berkeley.edu/docs/asis96/asis96.html; K. McCain, "Mapping Authors in Intellectual Space: A technical Overview," Journal of the American Society for Information Science, 41(6):433–443, 1990. A Dual Iterative Pattern Relation Expansion (DIPRE) method that addresses the problem of extracting (author, book) relationships from the web is described in S. Brin, "Extracting Patterns and Relations from the World Wide Web," WebDB, Valencia, Spain, 1998.

Another area to identify a set of related information on the World Wide Web is the Hyperlink-Induced Topic Search (HITS). HITS is a system that identifies authoritative web pages on the basis of the link structure of web pages. It iteratively identifies good hubs, that is pages that point to good authorities, and good authorities, that is pages pointed to by good hub pages. This technique has been extended to identify communities on the web, and to target a web crawler. One of HITS' limitations resides in the link topology of the pattern space, where the hubs and the authorities are of the same kind. i.e., they are all web pages. HITS is not defined in the text of web pages in the form of phrases containing relations in specific patterns. Exemplary HITS studies are reported in: D. Gibson et al., "Inferring Web Communities from Link Topology," HyperText, pages 225–234, Pittsburgh, Pa., 1998; J. Kleinberg, "Authoritative Sources in a Hyperlinked Environment," Proc. of 9th ACM-SIAM Symposium on Discrete Algorithms, May 1997; R. Kumar, "Trawling the Web for Emerging Cyber-Communities," published on the WWW at URL: http://www8.org/w8-papers/4a-search-mining/trawling/trawling.html) as of Nov. 13, 1999; and S. Chakrabarti et al. "Focused Crawling: A New Approach to Topic-Specific Web Resource Discovery," Proc. of The $_8{}^{th}$ International World Wide Web Conference, Toronto, Canada, May 1999.

There is therefore a great and still unsatisfied need for a software system and associated method for automatically identifying and mining sets of related information on the World Wide Web, using the duality concept for quality enhancement.

SUMMARY OF THE INVENTION

In accordance with the present invention, a computer program product is provided as an automatic mining system to identify a set of related information on the WWW, with a high degree of confidence, using a duality concept. Duality problems arise, for example, when a user attempts to identify a pair of related phrases such as (book, author); (name, email); (acronym, expansion); or similar other relations. The mining system addresses the duality problems by iteratively refining mutually dependent approximations to their identifications. Specifically, the mining system iteratively refines (i) pairs of terms that are related in a specific way, and (ii) the patterns of their occurrences in web pages, i.e., the ways in which the related phrases are marked in the web pages. The automatic mining system runs in an iterative fashion for continuously and incrementally refining the patterns and patterns.

The automatic mining system includes a computer program product such as a software package, which is generally comprised of a database and two identifiers: a relation identifier and a pattern identifier. The database contains the previously identified pairs or sets of relations $R_{i-1}$ that have been identified by the relation identifier, and the set of patterns $P_{i-1}$ that have already been identified by the pattern identifier. Initially, the database begins with small seed sets of relations $R_0$ and patterns $P_0$ that are continuously and iteratively broadened by the automatic mining system.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items.

DETAILED DESCRIPTION OF THE INVENTION

The following definitions and explanations provide background information pertaining to the technical field of the present invention, and are intended to facilitate the understanding of the present invention without limiting its scope:

Crawler or spider: A program that automatically explores the World Wide Web by retrieving a document and recursively retrieving some or all the documents that are linked to it.

Gateway: A standard interface that specifies how a web server launches and interacts with external programs (such as a database search engine) in response to requests from clients.

Internet: A collection of interconnected public and private computer networks that are linked together with routers by a set of standards protocols to form a global, distributed network.

Server: A software program or a computer that responds to requests from a web browser by returning ("serving") web documents.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client—server hypertext distributed information retrieval system.

Figure 1:
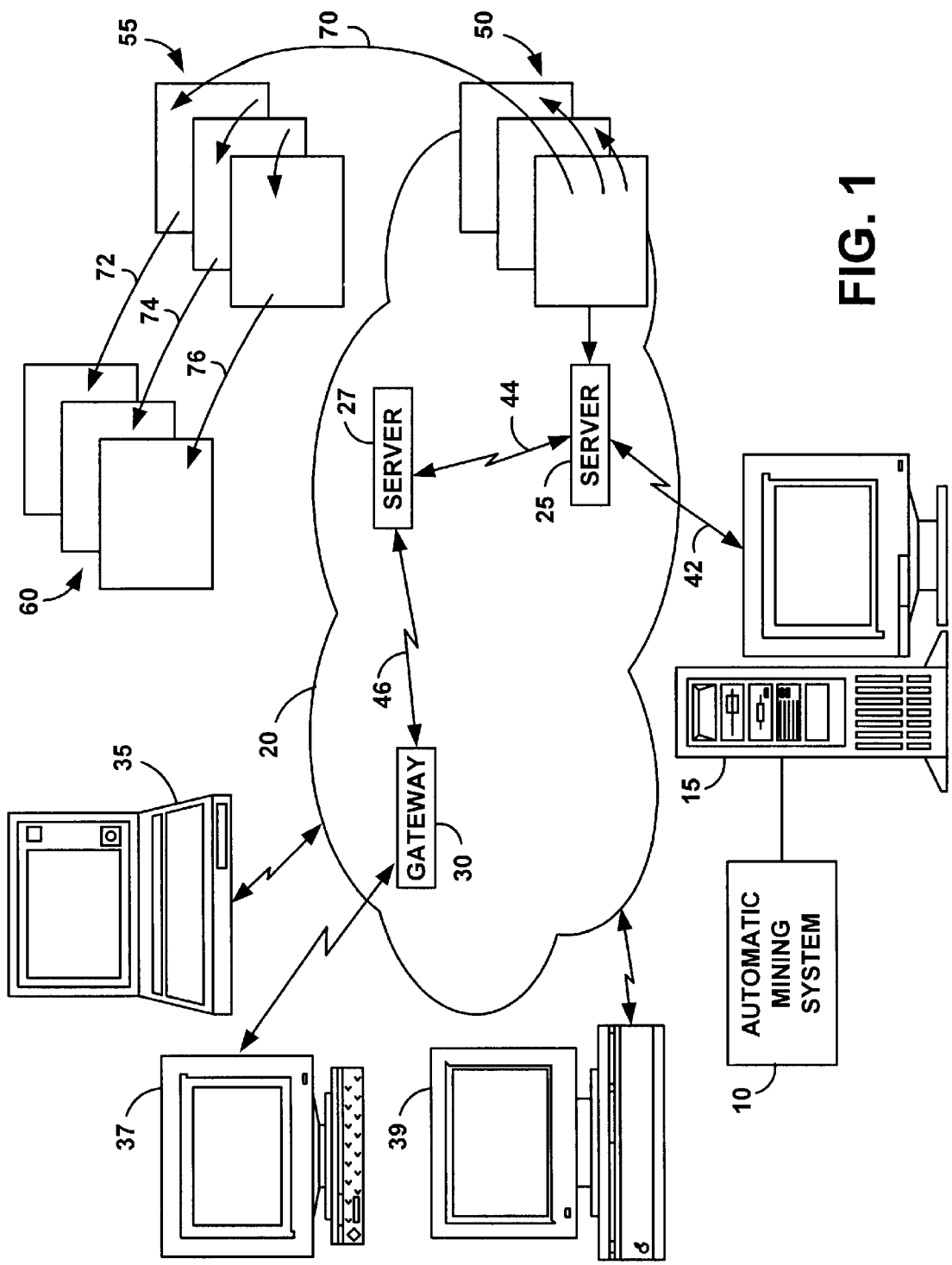
FIG. 1 is a schematic illustration of an exemplary operating environment in which the automatic mining system of the present invention is used.

FIG. 1 portrays the overall environment in which the automatic mining system 10 according to the present invention can be used. The automatic mining system 10 includes a software or computer program product which is typically embedded within, or installed on a host server 15. Alternatively, the automatic mining system 10 can be saved on a suitable storage medium such as a diskette, a CD, a hard drive, or like devices. The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote internet users are represented by a variety of computers such as computers 35, 37, 39, and can query the automatic mining system 10 for the desired information. Although the automatic mining system 10 will be described in connection with the WWW, it should be clear that the automatic mining system 10 can be used with a stand-alone database of terms and associated meanings that may have been derived from the WWW or another source.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, 60. The hypertext documents 50, 55, 60 most likely include embedded hypertext links to other locally stored pages, and hypertext links 70, 72, 74, 76 to other webs sites or documents 55, 60 that are stored by various web servers such as the server 27.

Figure 2:
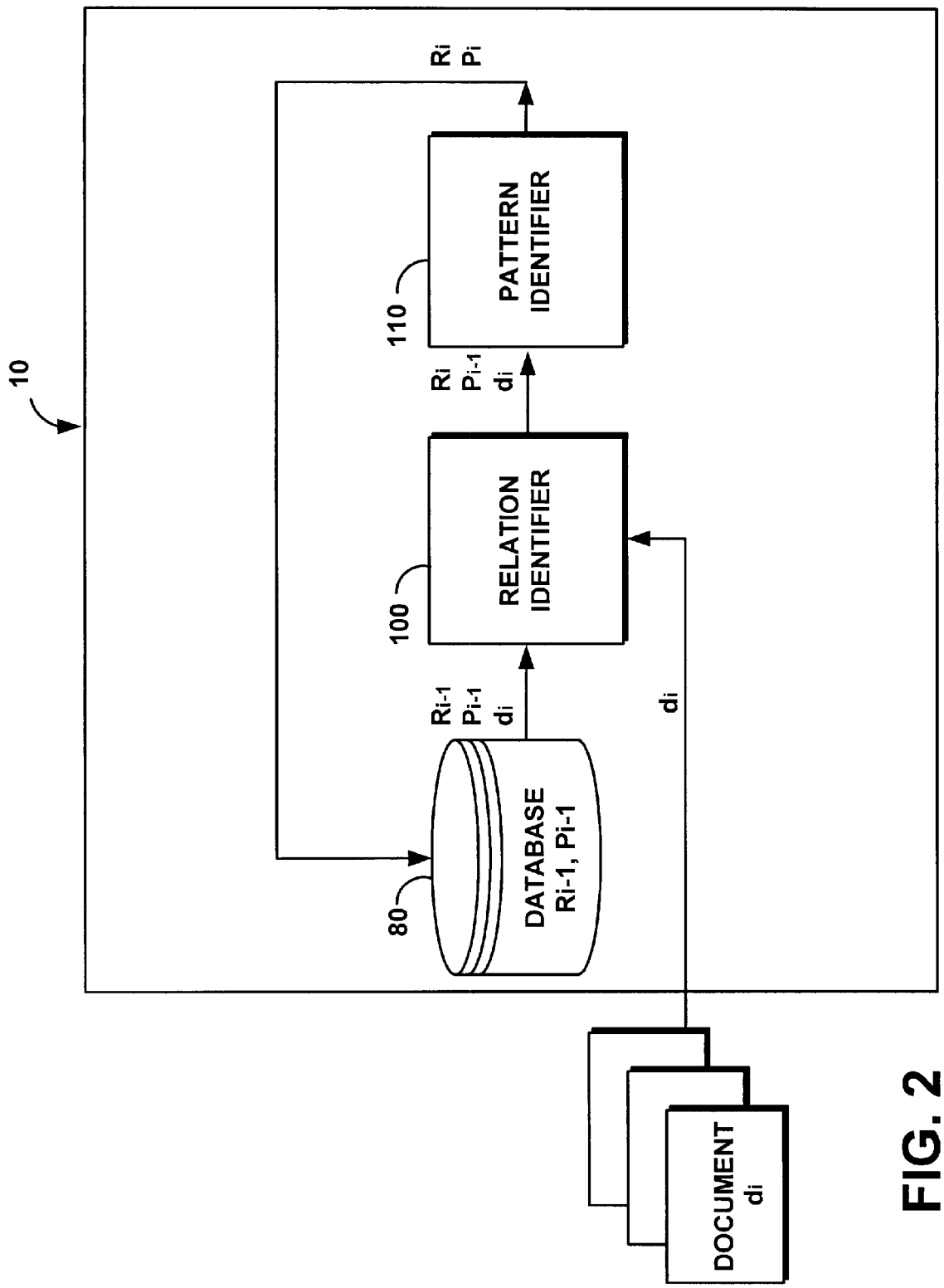
FIG. 2 is a block diagram of the automatic mining system of FIG. 1.

The automatic mining system 10 will now be described in more detail with further reference to FIG. 2. The automatic mining system 10 includes a computer program product such as a software package, which is generally comprised of a database 80 and two identifiers (also referred to as routines or modules): a relation identifier 100, and a pattern identifier 110. In an alternative embodiment, the database 80 does not form part of the automatic mining system 10.

The database 80 contains the set of relations $R_{i-1}$ that have already been identified by the relation identifier 100, and the set of patterns $P_{i-1}$ that have already been identified by the pattern identifier 110. Initially, the database 80 begins with a small seed of relations $R_0$ and a small seed of patterns $P_0$, which are continuously and iteratively broadened by the automatic mining system 10, as it will be explained later in greater detail.

In one embodiment, a crawler that resides in the host server 15, visits and downloads every page on the WWW at periodic intervals, for example about once a month. During a visit to a web page or document $d_i$, the crawler downloads the document content to the host server 15. The host server 15 forwards the document $d_i$ to the automatic mining system 10, which, in turn, scans the document $d_i$ for potential pairs or relations of related information.

Using the document $d_i$, the set of relations $R_{i-1}$ that have been previously identified by the relation identifier 110, and the set of patterns $P_{i-1}$ that have been previously identified by the pattern identifier 110, and stored in the database 80, the relation identifier 100 derives the relation $r_i$, and therefrom expresses the set of relations $R_i$ as follows:

$$R_i: \{R_{i-1}+r_i\}.$$

The pattern identifier 110 uses the document $d_i$, the derived relation $r_i$, and the set of patterns $P_{i-1}$ to derive the pattern $p_i$. The derived relation $r_i$ and pattern $p_i$ are, in turn, stored in the database 80 for use to recognize additional sets of relations $R_{i+1}$, and pattern $P_{i+1}$.

Having described the main components of the automatic mining system 10, its operation will now be described with further reference to FIG. 3 and the following Table 1.

TABLE 1

SAMPLE DATABASE ENTRIES

| $R_{i\text{-}1}$: ((Employee, Employer)} Relationship:Employment | $P_{i\text{-}1}$: {Pattern} |
|---|---|
| (A, B) | A "is employed by" B |
| (C, D) | C "works for" D |
| (E, F) | E "is an employee of" F |
| (G, H) | H "employs" G |
| (I, J) | J "hired" I |

As used herein, a relation is comprised of a pair of two relevant terms, items, or persons. For example, in Table 1 above, the first relation entry $r_0$ is the initial seed and includes a pair comprised of two terms: employee (A) and employer (B). The relationship between the terms (A) and (B) of the seed relation or pair (A, B) is that of an employee-employer, and is expressed by, or classified under the category "Employment". Although the terms relation and pair are used interchangeably, a relation is more accurately defined as the phrase that connects the components or entities in the pair.

The set of patterns $P_{i-1}$ defines a format according to which the pairs of terms occur in a text such as document $d_i$. For example, in Table 1 above, the initial or seed pattern $p_0$ is expressed in the following format: {A "is employed by" B}. The pattern is a phrase in the document $d_i$ that defines the relationship between the terms A and B of the relation (A, B).

The set if pattern $P_{i-1}$ includes a set of individual patterns $p_n$ and can be expressed as follows:

$$P_{i-1}=P_{i-2}+p'_{i-1},$$

where $P_{i-2}$ is a set of patterns that have been identified by the pattern identifier including an (i-2)$^{th}$ iteration, and $p'_{i-1}$ are the patterns that have been recently identified by the pattern identifier 110, during the (i-1)$^{th}$ iteration.

Figure 3:
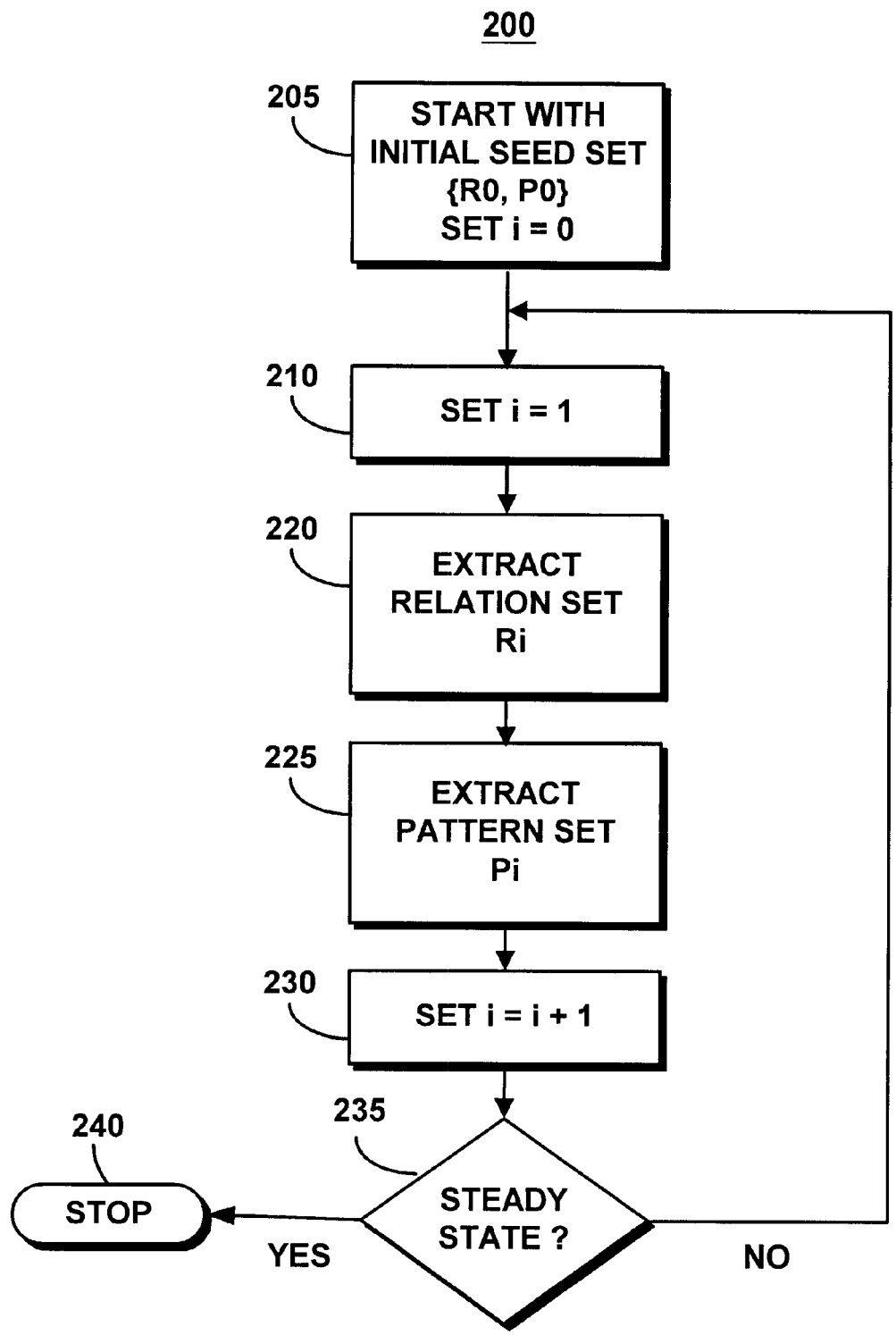
FIG. 3 is a high level flow chart that illustrates the operation of a preferred embodiment of the automatic mining system of FIG. 2.

The operation of the automatic mining system 10 is represented by a process 200 in FIG. 3. The process 200 starts at block or step 205 with a small seed relation or pair (A, B), which is related by the relation $r_0$ and expressed according to pattern $p_0$. The process 200 then sets i=1 at step 210, and accepts the document $d_1$ (FIG. 2) that includes the second relation or pair (C, D). Knowing the previously saved pattern $p_0$, the relation identifier 100 (FIG. 2) extracts or identifies the relation $r_1$ namely (Employee, Employer) within the relationship (Employment), as illustrated by step 220. The relation identifier 100 looks for the phrase "X is employed by Y" in document $d_i$. The actual values of the terms X and Y define a new relation (X, Y), such as (C, D).

Concurrently or sequentially with the extraction of the relationship $R_i$, and knowing the relation $r_1$, the pattern identifier 110 identifies the pattern $p_1$, namely (C "works for" D). For the identification of a new pattern, the pattern identifier 110 looks for the terms of the relation. For example, the pattern identifier 110 looks for the terms C and D for the relation (C, D) that occur in close proximity to each other within document $d_i$. The phrase that encompasses the terms C and D describes the (Employment) relationship between these terms and defines a new pattern.

As a result, if in future searches the following pattern appears: (K works for L), the automatic mining system 10 associates the previously learned pattern $p_1$ with the current terms of the relation (K, L), and applies the learnt relation $r_1$. The automatic system 10 then stores the learned relation (K, L) and its corresponding pattern in the database 80.

Having mined the sets of relations $R_i$ and patterns $P_i$, the process 200 stores this information in the database 80 (FIG. 2), and sets i=i+1, as illustrated by step 230. The process 200 then inquires at step 235 if a steady state has been reached. The steady state is said to be reached when all the documents are repeatedly investigated and no new relations or patterns are learned or, alternatively, a threshold time or another resource is reached. If the steady state is not reached, the process 200 repeats the loop comprised of steps 210, 220, 225, 230 and 235 until a steady state condition is determined. If at step 235 the process 200 determines that a steady state has been reached, the process 200 is terminated at step 240.

A user can query the database 80 for the desired relationship, i.e., (Employment), associated with the employer (B), to obtain the list of B's employees with a high degree of confidence.

It is to be understood that the specific embodiments of the invention that have been described are merely illustrative of certain application of the principles of the present invention. Numerous modifications may be made to automatic mining system and associated methods described herein without departing from the spirit and scope of the present invention. Moreover, while the present invention is described for illustration purpose only in relation to the WWW, it should be clear that the invention is applicable as well to databases and other tables with indexed entries.

What is claimed is:

1. A system for automatically and iteratively mining related terms in a document $d_i$ through relations and patterns of occurrences, comprising:

a database for storing a set of previously identified relations $R_{i-1}$ and a set of previously identified patterns $P_{i-1}$;

a relation identifier that uses the document $d_i$ and the set of patterns $P_{i-1}$ to derive a new relation $r_i$;

a pattern identifier that uses the document $d_i$ and the set of relations $R_{i-1}$ and the relation $r_i$ for deriving a new pattern $p_i$ that has not been predetermined; and wherein the set of patterns $P_{i-1}$ includes individual patterns $p_n$ and is expressed as follows:

$$P_{i-1}=P_{i-2}Up'_{i-1},$$

where $P_{i-2}$ is a set of patterns that have been identified by the pattern identifier including an (i-2)$^{th}$ iteration, and $p'_{i-1}$ are the patterns that have been recently identified by the pattern identifier during an (i-1)$^{th}$ iteration.

2. The system according to claim 1, wherein the database stores the relation $r_i$ and pattern $p_i$.

3. The system according to claim 1, wherein the set of patterns $P_{i-1}$ defines a format according to which the relation $r_1$ occurs in document $d_i$.

4. A computer program product for automatically and iteratively mining related terms in a document $d_i$ through relationships and patterns of occurrences, comprising:

a database for storing a set of previously identified relations $R_{i-1}$ and a set of previously identified patterns $P_{i-1}$;

a relation identifier that uses the document $d_i$ and the set of patterns $P_{i-1}$ to derive a new relation $r_i$;

a pattern identifier that uses the document $d_i$ and the set of relations $R_{i-1}$ and the relation $r_i$ for deriving a new pattern $p_i$ that has not been predetermined; and wherein the set of patterns $P_{i-1}$ includes individual patterns $p_n$ and is expressed as follows:

$$P_{i-1} = P_{i-2} U p'_{i-1},$$

where $P_{i-2}$ is a set of patterns that have been identified by the pattern identifier including an $(i-2)^{th}$ iteration, and $p'_{i-1}$ are the patterns that have been recently identified by the pattern identifier during an $(i-1)^{th}$ iteration.

5. The computer program product according to claim 4, wherein the database stores the sets of relations $R_i$ and pattern $P_i$.

6. The computer program product according to claim 5, wherein the set of patterns $P_{i-1}$ defines a format according to which the relation $r_1$ occurs in document $d_i$.

7. A method for automatically and iteratively mining related terms in a document $d_i$ through relationships and patterns of occurrences, comprising:

storing previously identified sets of relations $R_{i-1}$ and patterns $P_{i-1}$;

using the document $d_i$ and the set of relations $R_{i-1}$ to derive a relation $r_i$;

using the document $d_i$ and the set of patterns $R_i$ to derive new pattern $p_i$ that has not been predetermined; and wherein defining the pattern $P_{i-1}$ includes expressing the pattern $P_{i-1}$ by a set of individual patterns $p_n$ as follows:

$$P_{i-1} = P_{i-2} U p'_{i-1},$$

where $P_{1-2}$ is a set of patterns that have been identified including an $(i-2)^{th}$ iteration, and $p'_{i-1}$ are the patterns that have been recently identified during an $(i-1)^{th}$ iteration.

8. The method according to claim 7, further including storing the relation $r_i$ and pattern $p_i$ in a database.

9. The method according to claim 7, further including defining the pattern $p_i$ by a format according to which the relation $r_i$ occurs in the document $d_i$.

* * * * *